July 2, 1940.  M. ZAIGER  2,206,343
WIPER BLADE ATTACHMENT
Filed April 3, 1939
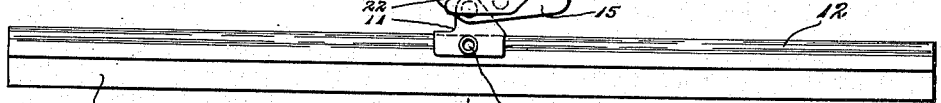
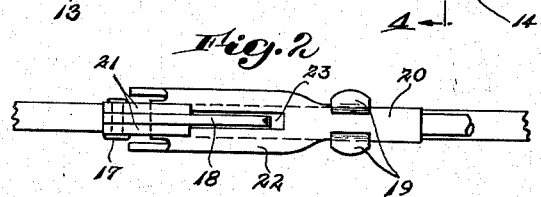
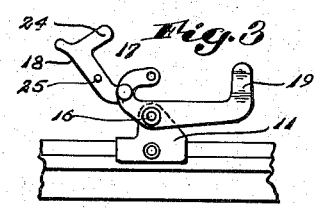
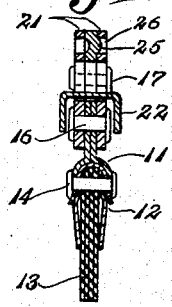
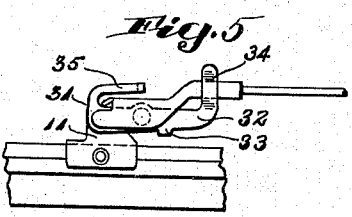
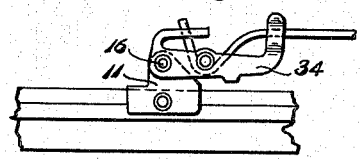
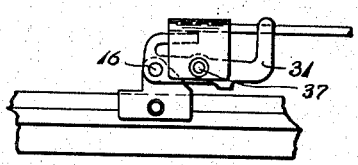
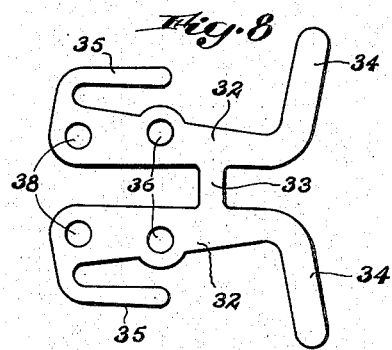
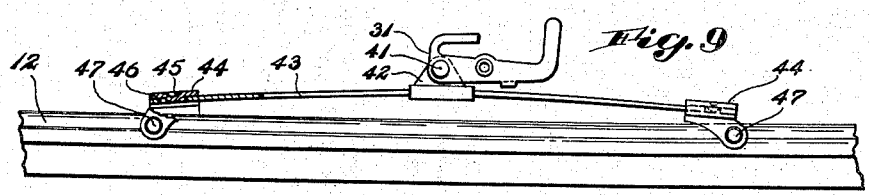
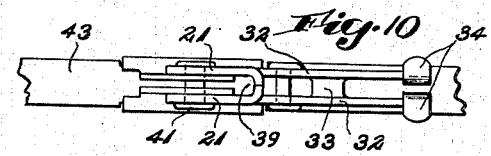
Inventor
Max Zaiger
by Thomson & Thomson
his Attys.

Patented July 2, 1940

2,206,343

UNITED STATES PATENT OFFICE 2,206,343

WIPER BLADE ATTACHMENT

Max Zaiger, Swampscott, Mass.

Application April 3, 1939, Serial No. 265,649

6 Claims. (Cl. 15—250)

This invention relates to wipers for cleaning rain or snow from the windshields of automobiles or the like, and pertains more particularly to improvements in the attachments for connecting the wiper blade to the wiper arm.

The subject matter of the present invention constitutes a further development of and improvement upon the attachments disclosed in my Patents Nos. 2,149,037, 2,153,224, and 2,153,225.

The principal purpose of the present invention is to provide a wiper blade attachment which permits the wiper arm to be swung through an angle approaching ninety degrees with relation to the wiper blade while preserving the security of the connection between arm and blade. For this purpose, I have provided an attachment comprising a saddle member rigidly fastened to the blade or blade holder, and a clip pivoted to the saddle and having means similar to those shown in my said Patent No. 2,153,224, for connecting thereto a wiper arm having either a U-shaped attaching portion, or a hook-type end, or a screwed-on type of end portion.

Further objects of the invention relate to the provision of a clip having a pivoted locking hook for engaging a slot in the U-shaped attaching portion and securing the end of that type of arm against unintentional detachment from the clip; the provision of a novel form of clip which may be pivoted as aforesaid to the saddle member and which comprises the resilient extensions for yieldingly gripping the wiper arm and the rearwardly bent finger for holding the end of the wiper arm, as shown in said Patent No. 2,153,224; and the provision of an improved form of attachment for connecting the ends of the spring yoke illustrated in said Patent No. 2,149,037 to the wiper blade or blade holder.

Recommended embodiments of the present invention are shown in the accompanying drawing, but it will be understood that the use of the invention is not intended to be limited to the structural details of the illustrated devices, except as the same may be set forth in the appended claims.

In said drawings,

Fig. 1 is a side elevation of one form of the improved attachment, showing the locking hook securing the end of a wiper arm having a U-shaped attaching portion;

Fig. 2 is a plan view, to larger scale, of the attachment shown in Fig. 1;

Fig. 3 is a side elevation thereof with the wiper arm removed and the hook in open position;

Fig. 4 is an enlarged section on line 4—4 of Fig. 1;

Figs. 5, 6, and 7 are side elevations of a modified form of pivotally connected clip (omitting the hook of Fig. 1), illustrating the use of the same clip for holding wiper arms having a U-shaped attaching portion, a hooked end and a screwed-on end, respectively;

Fig. 8 is a plan view of a metal blank from which the clip shown in Figs. 5 to 7 is produced;

Fig. 9 is a side elevation (with parts in section) showing the spring yoke form of blade attachment provided with a clip formed from the blank of Fig. 8 and having its ends pivoted to the blade holder at fixed positions; and Fig. 10 is an enlarged plan view of the clip shown in Fig. 9.

In the particular embodiment chosen for the purpose of illustration in Figs. 1 to 4 inclusive, the improved attachment comprises a saddle member 11 formed of two complemental metal pieces having the lower portions bent outwardly to straddle the holder 12 of the rubber wiper blade 13, to which the saddle is rigidly fastened by rivet 14, and a clip 15 having complemental side members applied to opposite sides of the upward extension of the saddle, and pivoted thereto by a pin or rivet 16. The side members of the clip are also connected by a rivet 17 which serves as a pivot for the locking hook 18, hereinafter described.

One end of the clip is provided with resilient extensions 19 which project upwardly from the respective side members thereof in operative relation to receive and grip the wiper arm 20, in substantially the same manner as explained in my said Patent No. 2,153,224; and the side members at the opposite or forward ends of the clip are formed with upwardly and rearwardly projecting fingers 21 which overlie the said side members and serve to confine and retain the forward end of the U-shaped attaching member 22, as also explained in said patent.

These U-shaped wiper arm attaching members are invariably formed with a slot 23 in the flat top thereof, as best shown in Fig. 2. In order to securely hold that type of arm end in my clip, I have provided the locking hook 18 which has a tip 24 receivable in said slot 23 when the pivoted hook is swung to locking position as shown in Fig. 1. The hook member 18 is pivoted at 17 between the upwardly bent fingers 21 of the side member of the clip, as previously indicated; and the hook is formed with a side projection or detent 25 which engages in an opening 26 to hold the hook member in such locking position, as best shown in Fig. 4. The hook also has a projection 27 so that it may be easily disengaged from locking position by the finger of the user.

A clip formed as above described may be swung on the pivot 16 through an arc of approximately ninety degrees or until the rear end of the clip is substantially upright with respect to the wiper blade 12 and saddle 11. This feature ensures that the connection between arm and blade will be secure irrespective of the operating angle between the wiper arm and the wiper blade, so that the blade 13 will properly engage the windshield surface regardless of the location of the motor which actuates the arm. Furthermore, the arm may be easily connected to the clip in a variety of relative positions between the arm and the blade, as may be most convenient to the user.

The form of clip shown in Figs. 5 to 7 is made from a blank shaped as shown in Fig. 8, and is pivoted at 16 to the saddle 11 substantially in the manner above explained. The clip 31, however, is made in one piece rather than of two side members, the sides 32 of clip 31 being integrally connected by the bridge 33. Side members 32 are formed with the resilient arm-gripping extensions 34 and the upwardly and rearwardly bent fingers 35, corresponding to the extensions 19 and fingers 21 of the previous embodiment; but the clip 31 is not provided with a hook like the hook member 18.

Clip 31 may be used with the three types of arm ends as shown in Figs. 5 to 7 respectively, the ends of the fingers 21 being bent together to form an opening 39 (Fig. 10) for receiving the tip end of the hook type arm of Fig. 6; and side members 32 having openings 36 to receive a screw 37 for holding the screw-type arm end of Fig. 7. The holes 38 of said sides receive the rivet 16 which pivotally connects the clip to the saddle 11. These three modes of attachment between the clip and the respective arm types is also explained in my aforesaid Patent No. 2,153,224.

In the forms illustrated in Figs. 9 and 10, the clip 31, just described, is pivoted at 41 to a saddle member 42 which embraces and is rigidly attached to a flat spring yoke 43 the ends of which are inserted and retained within channeled portions of end saddles 44, by means of detents 45 struck inwardly from the tops of said saddles and received in openings 46 in the respective ends of the yoke. The saddles 44 are connected to the blade holder 12 by rivets 47 which permit the saddles to be swung on these pivots, but which hold the two saddles in fixed relative position with respect to each other, as compared with the sliding connection at one end which is shown in my said Patent No. 2,149,037. By fixing the ends of the yoke in the manner just explained, full advantage may be taken of the resiliency of the spring yoke, and the blade is held against the windshield with firm and uniform pressure throughout its length.

I claim:

1. A wiper blade attachment of the character described, comprising a saddle member connectable to the blade, a clip for holding the end of a wiper arm, a locking member pivoted to the clip and engageable in a slot of the wiper arm, and means pivotally connecting the clip to the saddle so that the clip and wiper arm may be swung through a substantial arc relative to the blade, without disconnecting the arm from the clip.

2. A wiper blade attachment of the character described, comprising a saddle member connectable to the blade, a clip for holding the end of a wiper arm, and means pivotally connecting the clip to the saddle so that the clip and wiper arm may be swung through a substantial arc relative to the blade, without disconnecting the arm from the clip, the clip having integral resilient extensions for receiving and yieldingly gripping the wiper arm, and a rearwardly bent finger at its opposite end, the finger having an opening for receiving the end of a hook type wiper arm.

3. A wiper blade attachment of the character described, comprising a saddle member connectable to the blade, a clip for holding the end of a wiper arm, and means pivotally connecting the clip to the saddle so that the clip and wiper arm may be swung through a substantial arc relative to the blade, without disconnecting the arm from the clip, the clip having integral resilient extensions for receiving and yieldingly gripping the wiper arm, and an upwardly and rearwardly bent finger at its opposite end for holding the forward end of an arm having a U-shaped attaching portion provided with a slot therein, and a hook member pivoted to said finger and having a tip engageable in said slot.

4. A wiper blade attachment of the character described, comprising a saddle member connectable to the blade, a clip for holding the end of a wiper arm, means pivotally connecting the clip to the saddle so that the clip and wiper arm may be swung through a substantial arc relative to the blade, without disconnecting the arm from the clip, and a hook member pivotally connected to the clip and having a tip engageable in the slot of the U-shaped attaching member of the wiper arm to releasably secure the arm to the clip.

5. A blade attachment of the class described, comprising a saddle member adapted to straddle the blade and to be affixed thereto, and having an upwardly projecting portion, a clip comprising side members having complemental resilient extensions at the rearward end thereof for receiving and gripping a wiper arm, and complemental fingers projecting upwardly and rearwardly at the opposite end thereof to hold the forward end of the arm, a pin pivotally connecting the upward extension of the saddle between the side members of the clip so that the clip may be swung through a substantial arc with respect to the blade, and a locking hook pivotally connected to the clip between its side members and engageable with the end of the arm held in the clip to secure the same against unintentional displacement.

6. A wiper blade attachment of the character described, comprising a saddle member connectable to the blade, a clip for holding the end of a wiper arm, means pivotally connecting the clip to the saddle so that the clip and wiper arm may be swung through a substantial arc relative to the blade, without disconnecting the arm from the blade, said clip having resilient extensions for yieldingly gripping the wiper arm remote from its end, and means carried by the clip for restraining forward and upward movement of the forward end of the arm.

MAX ZAIGER.